April 16, 1963 G. A. SHIRN 3,085,979
METHOD FOR INDIFFUSION
Filed July 6, 1959
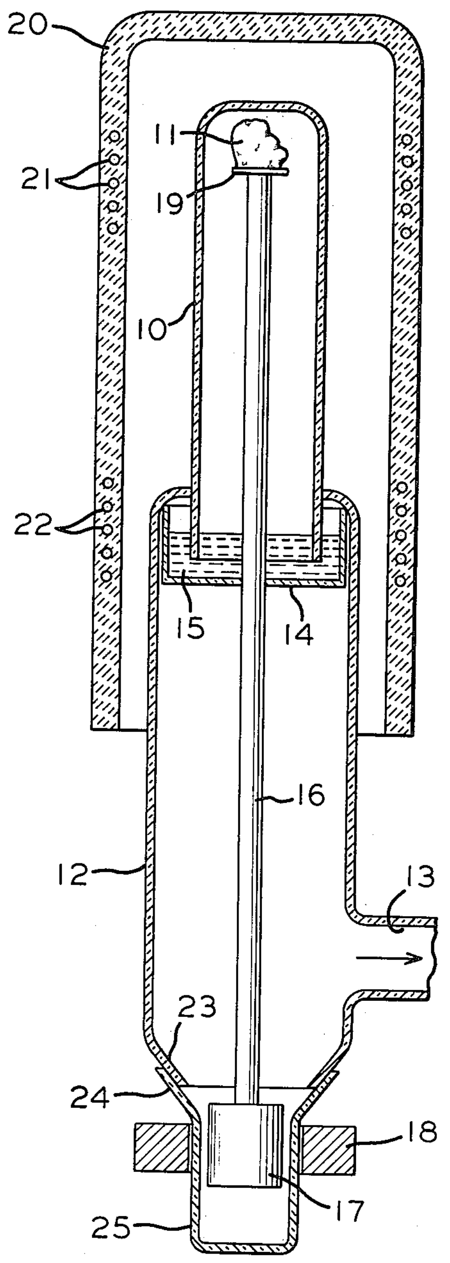
INVENTOR
GEORGE A. SHIRN
BY Connolly and Hutz
HIS ATTORNEYS United States Patent Office 3,085,979

Patented Apr. 16, 1963

3,085,979

METHOD FOR INDIFFUSION

George A. Shirn, Williamstown, Mass., assignor to Sprague Electric Company, North Adams, Mass., a corporation of Massachusetts Filed July 6, 1959, Ser. No. 825,218
3 Claims. (Cl. 252—62.3)

This invention relates to a method and apparatus for the indiffusion of impurities into a semiconductive body and, more particularly, to the production of a semiconductive material by gaseous indiffusion in a vacuum system.

In the production of semiconductive material, it is advantageous to provide indiffusion of an impurity material into a semiconductive material. The semiconductive material may be either of a p-type conductivity or an n-type conductivity. Conductivity, as referred to herein, is the property of low resistance to current flow through the semiconductive material. The types of conductivity are determined by the types of electronic carriers present in the semiconductive types. For example, p-type semiconductive material is characterized by holes as electric charge carriers. On the other hand, n-type semiconductive material is characterized by electrons as electric charge carriers. These carriers are introduced into the semiconductive material by certain impurities in respective semiconductive materials. A germanium semiconductive body will have p-type conductivity when boron, aluminum, indium and gallium are introduced. A germanium body has n-type conductivity when phosphorus, arsenic, antimony or bismuth are introduced to provide conductivity. It is, thus, seen that the introduction of impurities into the semiconductive material is a vital factor in the creation of the semiconductive material and the conductivity type.

Diffusion of impurities into a semiconductor may be produced by diffusion from a gas phase. For various reasons, it is preferable to carry on the gaseous indiffusion within a vacuum system, that is, evacuate a volume of space and indiffuse in the evacuated space. The vacuum system method, however, calls for making a high vacuum seal around the evacuated space which is troublesome and, further, in keeping the high vacuum seal stable at the elevated temperatures of the indiffusion process.

It is an object of this invention to provide an improved high vacuum seal of the indiffusion chamber in vacuum apparatus for gaseous indiffusion.

It is another object of this invention to provide a vacuum system for gaseous indiffusion having a vacuum seal made up of a diffusant.

It is still another object of this invention to provide a stable vacuum seal for gaseous indiffusion in a vacuum system.

These and other objects of this invention will become more apparent upon consideration of the following description taken together with the accompanying drawing which shows a vacuum system apparatus according to this invention in vertical cross-section.

In general, this invention provides a seal in a vacuum system for gaseous indiffusion of semiconductive materials. This seal is between the chamber of indiffusion and the evacuating means and is composed of a diffusant. Further, the sealing material may act as a getter for spurious impurities within the system and particularly within the semiconductive material. The invention also involves a novel method of indiffusion of an impurity into a semiconductive substrate.

An embodiment of the invention is shown in the FIGURE having a quartz chamber 10 for the indiffusion operation. This cylindrical quartz chamber 10 has an open end and, as seen in the figure, is inverted with the open end downward. The chamber 10 contains a germanium body 11 which forms the substrate into which the indiffusion takes place in this preferred embodiment. The chamber 10 leads at its open end into an evacuating chamber 12. The evacuating chamber 12 is suitably connected to a pump or other vacuum producing means (not shown) through a passage 13.

To seal the chamber 10 from the chamber 12, there is provided a cup 14 containing a sealing material 15 composed of an indiffusant which is molten at the temperatures of diffusion and also molten under the evacuating conditions. The cup 14 is mounted on a rod 16 which, in turn, is supported by means of a magnetic slug 17 at its end. The slug 17 is positioned in the field of a magnetic annulus 18. The magnetic force of the field of the annulus 18 is sufficient to support the rod 16, the cup 14 and also a platform 19 on which the substrate body 11 rests at the upper end of the rod 16. A jacket 20 around the chamber 10 and the upper end of the chamber 12 contains two heating means 21 and 22 within the walls of the jacket 20. The heating means 21 are positioned to surround the platform 19 and the substrate body 11. The heater 22 is placed in the jacket 20 to surround the cup 14 and the sealing material 15. Thus, the heating of the substrate body 11 and the sealing material 15 is independent one of the other.

The closure of the chamber 10 is effected by the cup valve 14 which, fitting over the end of the chamber 10, immerses the end of the chamber 10 in the indium sealing material 15 when the device is set in closed position as shown in the figure. In this position, the indium material 15 bathing both sides of the end of the chamber 10 cuts off the interior of the chamber 10 from the chamber 12. At the same time, the dimension of the chamber 10 and the spacing within the cup 14 is sufficient to provide considerable surface area of the indium sealing material 15 within the chamber 10. Thus, the indium sealing material 15 is provided within the interior of the chamber 10 while, at the same time, maintaining the seal-off of the chamber 10 from the remainder of the sealed system. In this position, the indium can provide the indiffusant for the gaseous indiffusion of the substrate body 11.

As indicated above, the cup 14 is suitably maneuverable by means of the annulus 18 through the slug 17 and the rod 16. The annulus 18 is movable with a consequent raising and lowering of the cup 14. At the same time, the platform 19 is moved into and out of position at the upper end of the chamber 10. The lower end of the chamber 12 terminates in an opening formed by a tapered lip 23. A flared lip 24 on an end cap 25 forms a vacuum-tight seal with the lip 23. This arrangement provides flexibility in assembly of the device.

In assembly of the device, the system is evacuated to approximately $10^{-6}$ mm. of mercury with the cup 14 lowered. The lips 23 and 24 are sealed closed and the rod 16 is in lowered position. After the desired low pressure has been attained, the cup 14 is raised into the position where the indium sealing material 15 seals off the chamber 10. With the raising of the cup 14, the rod 16 also moves the substrate body 11 into position so that both are within the respective heaters 21 and 22. The furnace jacket 20 is maintained at a temperature sufficient to keep the indium molten during the above described sealing operation. This is a temperature in excess of 155° C.

When the seal has been formed by the sealing material 15 at the end of the chamber 10, and the substrate body 11 is positioned for indiffusion, the heaters 21 and 22 are raised in temperature to produce two heat zones within the jacket 20. The hotter heat zone is that produced by heater 21 around the body 11. The cooler heat zone is that produced by heater 22 around the cup 14. When indiffusing indium into germanium according to this invention, the germanium body is maintained at a temperature in the range of 750° to 900° C. while the indium material 15 within he cup 14 is maintained at a temperature in the range of from 500° to 750° C. At these temperatures, the indium is diffused out of the pool of indium sealing material 15 and is indiffused into the heated body 11.

At the same time, the indium of the sealing material 15 acts as a getter for absorbing gaseous impurity materials, especially copper, which may be present in the space within the chamber 10. The indium may also act as a getter for undesired materials in the germanium having vapor pressure sufficient to evaporate from the germanium into the space within the chamber 10.

In this embodiment, this invention has been described as applied to the indiffusion of indium into a germanium substrate. It will be appreciated by those skilled in the art that the indium could be replaced by some other material, molten at operating temperatures and useful as an indiffusant, for example, gallium. Similarly, the germanium could be replaced in the substrate by silicon or some other suitable material into which indiffusion is desired. Further, the indiffusant can be an n-type conductivity impurity as well as a p-type conductivity impurity. It is pointed out, however, that indium as the particularly preferred material provides features not obtainable in full by other materials. For this reason, it may be desirable to provide an alloy of indium with other indiffusants, provided that the diffusion coefficient of the other indiffusant is much greater than the diffusion coefficient of indium. Moreover, if an alloy between indium and the other material is not possible, then the indium and other material can be placed in the system as at the seal under the same thermal conditions but separated from each other.

The advantages of this invention have been outlined above. In summary, there is provided an effective seal which acts as a source of the indiffusant and as a getter of impurities in the atmosphere of the indiffusing chamber. This avoids the need of high vacuum sealing by conventional methods such as fusing glass or high vacuum greases or other sealing compounds. It preserves the advantages of vacuum system for gaseous indiffusion such as the precise control of temperature and vapor pressure of diffusant and the limitation and control of foreign impurities in the indiffusant atmosphere.

The above-described embodiment is set forth for the purpose of illustration of the spirit of this invention which is intended to be limited by the scope of the appended claims.

What is claimed is:

1. The method of indiffusing an impurity into a semiconductive material comprising the steps of positioning the semiconductive material in a first chamber, evacuating said first chamber through an aperture, after evacuating said chamber moving a molten conductivity-type determining impurity selected from the group consisting of elements of group III of the periodic table and elements of group V of the periodic table and having liquidity at a temperature below the temperature of indiffusion into said semiconductive material and contained within a second chamber, engaging said aperture with said impurity to seal said first chamber, maintaining said impurity in molten condition and indiffusing from said molten source of said impurity into said semiconductive body in said evacuated first chamber while simultaneously maintaining the semiconductive material at a temperature in excess of the temperature of the molten impurity and maintaining the evacuated interior of said chamber in sealed condition by the engagement of said molten material with the opening in said first chamber.

2. The method of claim 1 in which the impurity is indium whereby undesired material of the first chamber is gettered.

3. The method of claim 1 in which the semiconductive material is germanium and the impurity is indium.

References Cited in the file of this patent

UNITED STATES PATENTS

| | | |
|---|---|---|
| 2,645,461 | Brown et al. | July 14, 1953 |
| 2,850,414 | Enomoto | Sept. 2, 1958 |

OTHER REFERENCES

Semiconductor Abstracts, vol. III, 1955, edited by Paskell, published by John Wiley and Sons, Inc., N.Y., page 4, abstract 17 of article by Bosenberg, "Diffusion of Antimony, Arsenic and Indium in Solid Germanium," Z. Naturforsch, 10*a*, pages 285–91 (1955).

Richardson: An Apparatus for Growing Single Crystals of Gallium Arsenide, Journal of Scientific Instruments, vol. 34, 1957, pages 289–290.